United States Patent [19]
Thompson et al.

[11] Patent Number: 5,754,141
[45] Date of Patent: May 19, 1998

[54] WIRELESS COMMUNICATION DEVICE HAVING A RECONFIGURABLE MATCHING CIRCUIT

[75] Inventors: David C. Thompson, Grayslake; Jin D. Kim, Mundelein; Brian J. Hassemer, Gurnee, all of Ill.

[73] Assignee: Motorola, Inc., Schaumburg, Ill.

[21] Appl. No.: 960,110

[22] Filed: Oct. 27, 1997

Related U.S. Application Data

[63] Continuation of Ser. No. 577,460, Dec. 22, 1995, abandoned.

[51] Int. Cl.$^6$ ........................................... H01Q 1/24
[52] U.S. Cl. ................. 343/702; 343/860; 455/575; 455/289
[58] Field of Search ..................... 343/860, 861, 343/702, 900, 901, 895; 455/89, 129, 575, 193.1, 193.2, 193.3, 289; H01Q 1/24

[56] References Cited

U.S. PATENT DOCUMENTS

| | | | |
|---|---|---|---|
| 4,860,024 | 8/1989 | Egashira | 343/702 |
| 4,862,182 | 8/1989 | Egashira | 343/702 |
| 5,144,324 | 9/1992 | Chin et al. | 343/702 |
| 5,177,492 | 1/1993 | Tomura et al. | 343/702 |
| 5,204,687 | 4/1993 | Elliott et al. | 343/702 |
| 5,212,491 | 5/1993 | Chin et al. | 343/745 |
| 5,245,350 | 9/1993 | Sroka | 343/702 |
| 5,335,368 | 8/1994 | Tamura | 455/90 |
| 5,353,036 | 10/1994 | Baldry | 343/702 |
| 5,374,937 | 12/1994 | Tsunekawa et al. | 343/702 |
| 5,467,097 | 11/1995 | Toko | 343/702 |

FOREIGN PATENT DOCUMENTS

| | | |
|---|---|---|
| 2036677 | 8/1991 | Canada . |
| 0 451 623 A1 | 10/1991 | European Pat. Off. . |
| 0617520A2 | 9/1994 | European Pat. Off. . |
| 1-160101 | 1/1989 | Japan . |
| 3-186001 | 8/1991 | Japan . |

*Primary Examiner*—Michael C. Wimer
*Attorney, Agent, or Firm*—Don Kordich; Lalita P. Williams

[57] ABSTRACT

A wireless communication device (20) provides a matching state between a radio circuit (28) and an antenna assembly (26) in both its retracted and extended positions, and does so with an elegant design that increases reliability and manufacturability by reducing the number and complexity of components and moving mechanical parts. A matching circuit (30), which is reconfigured according to a switch (32) that is responsive to the antenna's position, provides the matching states.

8 Claims, 5 Drawing Sheets

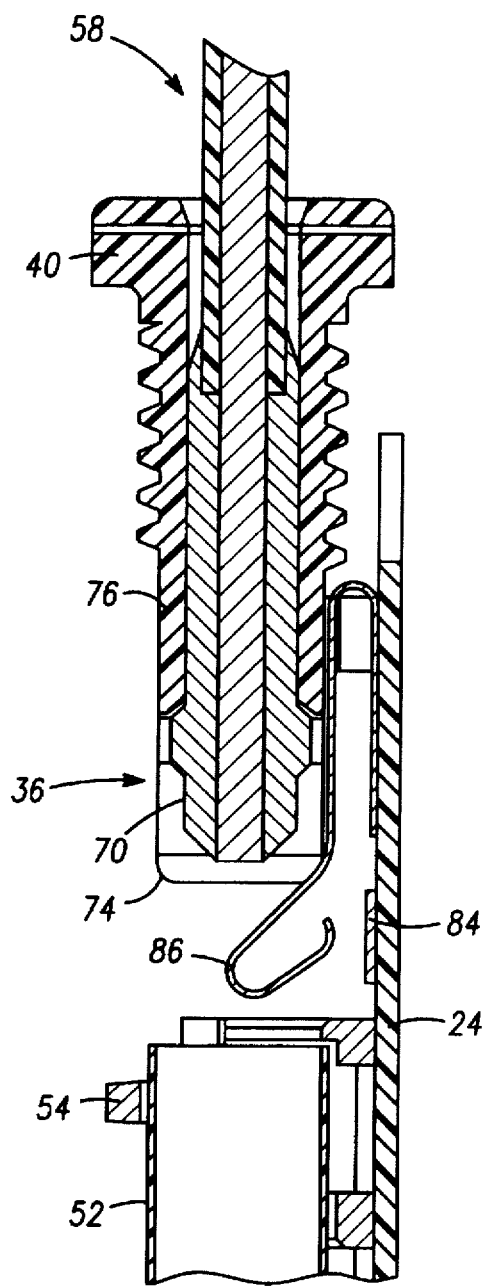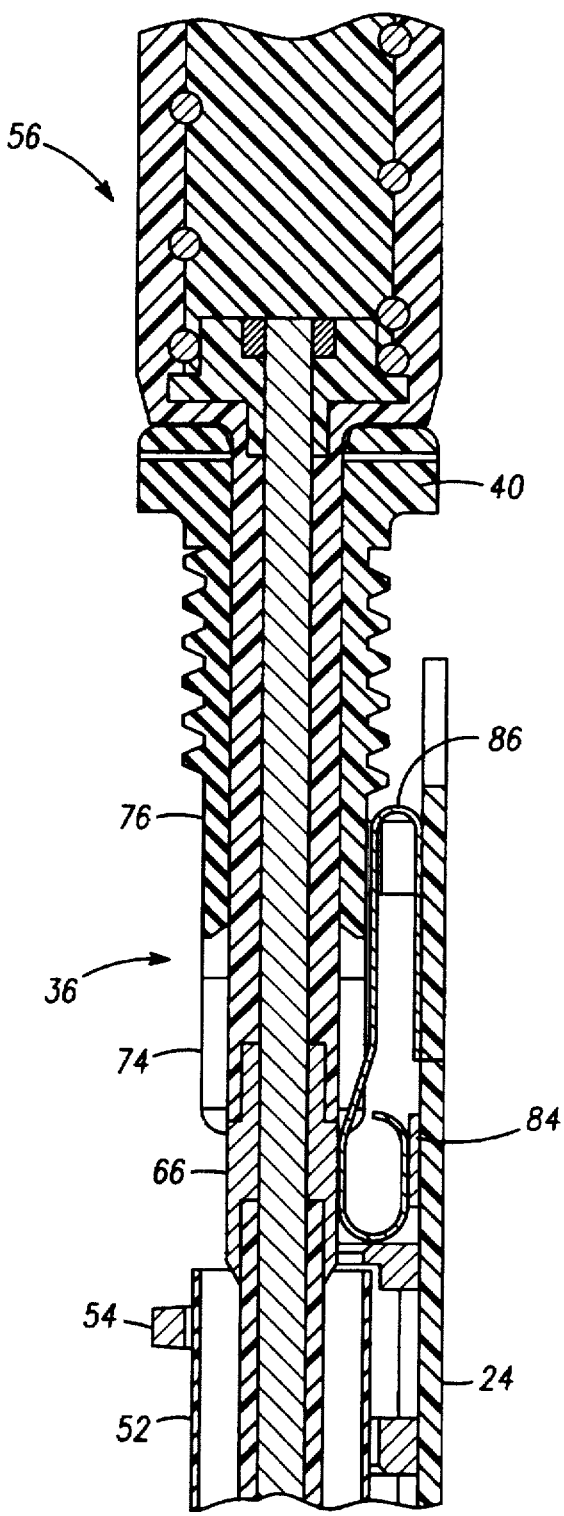
FIG.8
FIG.9

WIRELESS COMMUNICATION DEVICE HAVING A RECONFIGURABLE MATCHING CIRCUIT

This is a continuation of application Ser. No. 08/577,460, filed Dec. 22, 1995 and now abandoned.

FILED OF THE INVENTION

The present invention relates generally to the field of wireless communication, and more particularly to a wireless communication device. Although the invention is subject to a wide range of applications, it is especially suited for use in a handheld radiotelephone, and will be particularly described in that connection.

BACKGROUND OF THE INVENTION

Radiotelephones having a retractable compound antenna are known in the art. Published Canadian Patent Application No. 2,036,677 describes a radiotelephone having an extendible antenna that is capable of receiving signals in both the extended position and retracted position. This application, however, does not address the impedance imbalance of the antenna in its respective extended and retracted positions, or a solution for providing a matching state between the radio transceiver and antenna.

This patent application, as well as U.S. Pat. No. 5,177,492, also describe rod antenna mounting mechanisms attached to the casing of the radiotelephone, which grip the rod antenna to hold it in an extended or retracted position. The compound antennas used in the mechanisms are relatively rigid where a helix joins the rod, because the juncture of rod and helix is also the point that is electrically coupled to the radio feed terminal when the antenna is in the retracted position. Consequently, they have the problem of being easily damaged at the juncture when the radiotelephone is dropped.

Because retractable, compound antennas typically have a long flexible linear antenna element, this element needs to be guided into the radiotelephone. It is known to use a well formed out of the casing to guide the linear antenna element, such as described in U.S. Pat. No. 5,177,492.

This technique has the disadvantage of increasing the bulk and weight of the radiotelephone. Another known technique is to attach a straw-like tube to the casing. This technique has the disadvantage of requiring an assembly step specific to the casing, which otherwise would not be required. Another known technique is to attach the straw-like tube to the circuit board that already has many assembly steps associated with it. This technique has the disadvantage of requiring additional fastening components to be added and assembled to the circuit board, specific for the purpose of holding the straw, to an already crowded circuit board.

There are also known radiotelephones, as described in U.S. Pat. No. 5,374,937, having an extendible antenna that uses a single matching circuit and a first feed terminal to couple an inner circuit to the antenna in the extended position, and then bypass the matching circuit in the retracted position by coupling the inner circuit to the antenna in the retracted position by way of a second feed terminal disposed a distance from the first feed terminal. This technique has the disadvantage of requiring two feed terminals. It further has the disadvantage that the antenna portion between the two feed terminals radiates inside the housing, possibly interfering with sensitive electrical components disposed inside the housing.

Radiotelephones having a retractable compound antenna and a variable impedance matching circuit and single feed terminal are known in the art. One example of such known radiotelephones described in U.S. Pat. No. 5,335,368 and another is embodied in Model No. TZ-820B provided by NEC. This latter radiotelephone has a variable impedance matching circuit coupled with antenna, wherein the matching circuit consists of two parallel circuit paths, each path having a unique reactance. These circuit arrangements are shown in FIG. 1. The parallel circuit paths of a matching circuit 10, having reactive components $L_1$, $L_2$, and C, are selected in response to the position of an antenna 12 in order to match the impedance of antenna 12 to the impedance of a coaxial connector 14. The selection is made by a double-pole, double-throw switch 16 arranged so that the switch is thrown by lower end of antenna 12 forcing mechanical contacts, S, from a normally open position to a closed position as antenna 12 is moved from the extended position, shown in solid lines, to the retracted position, shown in dotted lines. The antenna 12 is held in its respective positions by a holding member 22 attached to a housing 24 of the radiotelephone, and guided by a conductive tube 20. Holding member 22 further functions to electrically couple the switch to the antenna. In addition to requiring a switch and a multipath matching circuit, a termination impedance 18 coupled between ground and one end of antenna 12, and the ground-coupled conductive tube 20, are necessary to provide the matching in the retracted position.

This matching technique is not suitable for all handheld radiotelephones. For example, it requires additional components in the matching circuit to provide the two connection states for matching; and it requires a relatively bulky switch to make the connection states. These additional components increase the size of the radiotelephone, which can be a handicap as radiotelephones become smaller. Furthermore, the switch increases the probability of a faulty connection in the sensitive transmission and reception signal path. It further has the disadvantage of requiring an additional termination impedance and conductive tube.

A need therefore exists for a handheld radiotelephone that provides a matching state between the transceiver and retractable compound antenna in both its positions, and does so with an elegant design that increases reliability and manufacturability by reducing the number and complexity of components and moving mechanical parts. A need also exists for a handheld radiotelephone that is not easily damaged when dropped at the point where the rod joins the helix.

BRIEF DESCRIPTION OF THE DRAWINGS

FIGS. 8 and 9 are fragmentary cross section views of the circuit board, a feed terminal, and portions of the antenna assembly shown in FIGS. 3 and 4, when the antenna is in the extended or retracted position, respectively.

DETAILED DESCRIPTION OF THE PREFERRED EMBODIMENTS

The wireless communication device described herein provide advantages over known handheld radiotelephones in that it provides a matching state between the radio circuit and retractable compound antenna in both the extended and retracted positions, and does so with a design that reduces the complexity of the matching circuit and switch.

These advantages over the conventional radiotelephones are principally provided by a single matching circuit, a single feed terminal, and a switch that bypasses, or shorts out, the matching circuit.

In general terms, when the antenna is in its extended position, the switch is open, and thus the matching circuit is coupled in series between the antenna assembly and the radio circuit. In this configuration, the matching circuit functions to match the high impedance of the antenna assembly (approx. 400 to 600 ohms) to the impedance of the radio circuit (approx. 50 ohms). Conversely, when the antenna is in the retracted position, the switch is closed, and thus the matching circuit is either bypassed and does not perform a matching function, or is bypassed and reconnected in parallel with the antenna to assist in providing a matching function.

Figure 1:
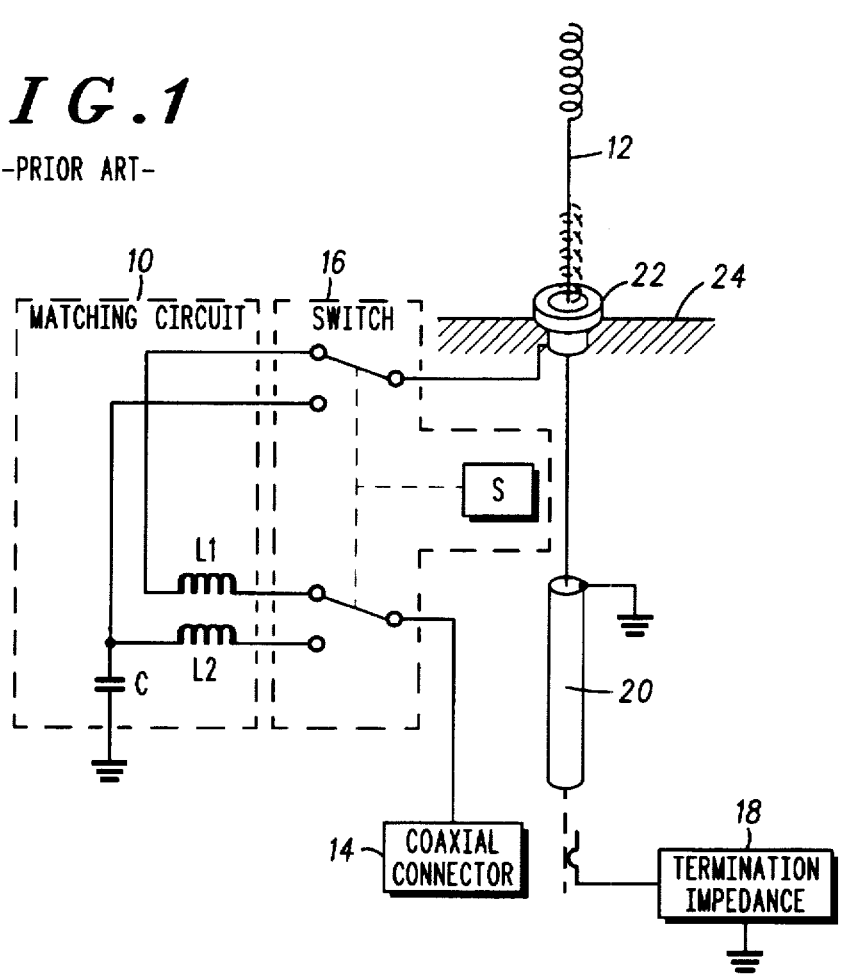
FIG. 1 is a general electrical schematic of a conventional matching circuit arrangement.
Figure 2:
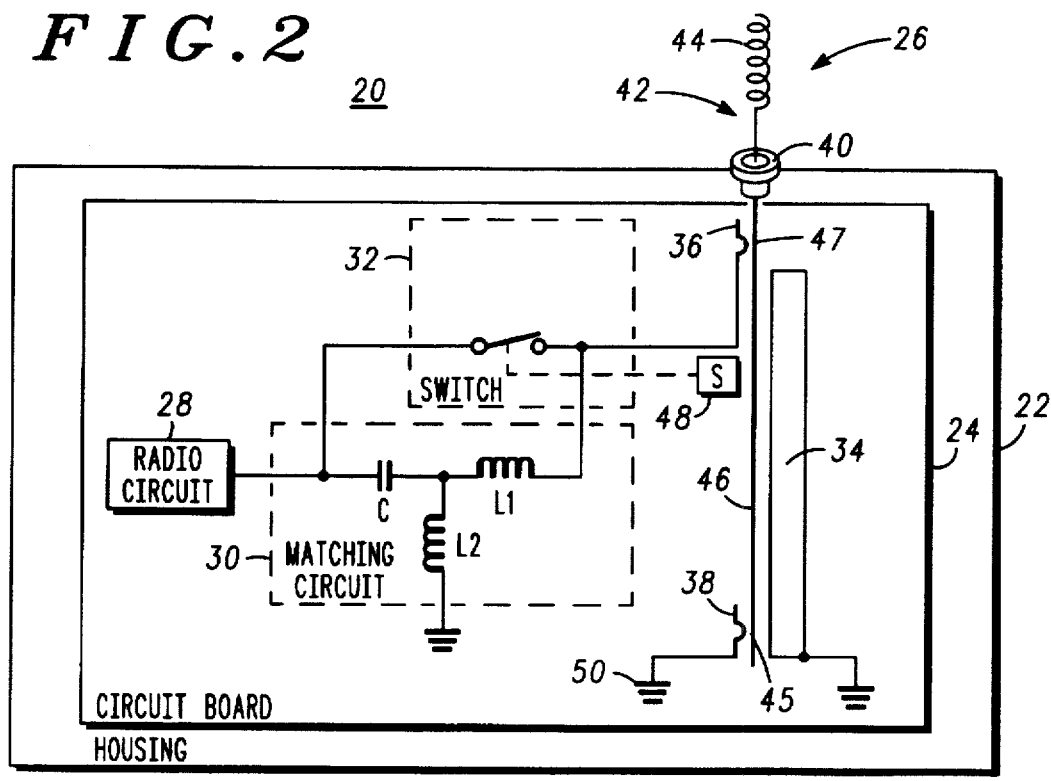
FIG. 2 is a general electrical schematic of a first embodiment of a radiotelephone configured according to the invention.

As illustrated in FIG. 2, in one such embodiment configured according to the present invention, a wireless communication device, e.g., a radiotelephone 20, comprises a housing 22; a circuit board 24, an antenna assembly 26, a radio circuit 28, a matching circuit 30, a switch 32, a ground plane 34, a feed terminal 36, and a ground terminal 38 coupled with a ground 50. Circuit board 24 is disposed inside housing 22, and radio circuit 28, matching circuit 30, switch 32, ground plane 34, feed terminal 36, and ground terminal 38 can be disposed on circuit board 24.

Antenna assembly 26 includes a bushing 40 and an antenna, e.g., a compound antenna 42 having a first antenna portion, e.g., at least a helicoil 44, and a second antenna portion, e.g., at least a portion of the rod 46. The first antenna portion is carried by the second antenna portion and can be electrically coupled, e.g., by direct electrical contact, to the second antenna portion. Bushing 40 can be affixed to housing 22, and compound antenna 42 is moveable within bushing 40 from a retracted position as shown in FIG. 2 to an extended position.

In the extended position the first antenna portion is located outside of the housing and the second antenna portion is substantially located outside of the housing. Further, a first coupling location 45 of the antenna, e.g., the lower end of the second antenna portion, is electrically coupled, e.g., in direct electrical contact, with feed terminal 36. In the retracted position, the first antenna portion is located substantially outside of housing 22, and the second antenna portion is located inside housing 22 and in close proximity to ground plane 34. Further, feed terminal 36 is electrically coupled, e.g., in direct electrical contact, with a second coupling location 47 of the antenna, e.g., the lower end of the first antenna portion, and ground terminal 38 is electrically coupled, e.g., in direct electrical contact, with first coupling location 45.

Compound antenna 42 has many parameters representative of the position of the compound antenna 42. For example, the physical location of compound antenna 42 relative housing 22 or feed terminal 36, the electrical impedance of compound antenna 42, or the strength of the electrical signal that compound antenna 42 receives.

Radio circuit 28 can be, e.g., a duplexer, a transmitter, a receiver, a modulator, a demodulator, or traces connecting the components of radio circuit 28, or some combination of these components and traces.

Matching circuit 30 is coupled between feed terminal 36 and radio circuit 28. Matching circuit 30 can be, e.g., a T-connected circuit with a capacitor C in one arm, an inductor $L_1$ in the other arm, and a ground-terminated inductor $L_2$ in the leg.

Switch 32 is electrically coupled between feed terminal 36 and radio circuit 28 in a parallel configuration to matching circuit 30. Switch 32 is operative to change state in response to a predetermined variation of the antenna's parameter, whereby switch 32 can redefine or rearrange matching circuit 30 when switch 32 changes state. When switch 32 is in one state, radio circuit 28 is directly coupled with feed terminal 36, in parallel with the reconfigured matching circuit. When switch 32 is in another state, radio circuit 28 is coupled with feed terminal 36 through matching circuit 30.

Although switch 32 and matching circuit 30 are shown as separate components in FIG. 2, switch 32 can be a subcomponent of matching circuit 30, or a sub-component of other components of radiotelephone 20.

Switch 32 can include, e.g., a single-pole, single-throw switch. Switch 32 can also include a sensor 48, or the sensor can be external to switch 32. Sensor 48 detects a predetermined variation of the antenna's parameter. Sensor 48 can be, e.g., the arm of the single-pole, single-throw switch that is normally open when the antenna is extended, and that is mechanically moved to the closed position by physical contact with the lower end of the second antenna portion. Accordingly, the parameter is the retractable antenna's position relative to housing 22 or feed terminal 36, and the predetermined variation is movement to a position that moves the switch to the closed position. Alternatively, it can be, e.g., a proximity sensor that measures the antenna location, a relative strength signal indicator that measures the strength of the signal received by compound antenna 42, or an impedance bridge that measures the impedance of compound antenna 42. Under each alternative, the sensor sends a control signal to switch 32, and switch 32 can change state in response to the control signal.

Regarding the electrical characteristics of the antenna, the impedance of the antenna in the extended position has a first impedance as viewed from feed terminal 36. In the retracted position, the antenna has a second impedance as viewed from feed terminal 36 that is the parallel combination of the impedance of the first antenna portion and the second antenna portion. Moreover, because the switch is closed in the retracted position, the matching circuit is reconnected and coupled between feed terminal 36 and ground, placing it in a parallel connection with the first antenna portion and the second antenna portion. Consequently, matching circuit 30 can be chosen not only to substantially match the first impedance of the antenna when in the extended position to the impedance of radio circuit 28 (when matching circuit 30 is in series with feed terminal 36 and radio circuit 28), but also to assist in matching the second impedance of the antenna when in the retracted position to the impedance of radio circuit 28. Furthermore, one of ordinary skill in the art will appreciate that the switch can be in a closed state when the antenna is in a first position, e.g., extended, and in an open state when the antenna is in a second position, e.g., retracted, and, correspondingly, the matching circuit in parallel when the antenna is extended and in series when the antenna is retracted.

The technique for selecting the first impedance of the antenna, the second impedance of the antenna, and the matching circuit to substantially match the first impedance of the antenna and also, when reconnected, to assist in matching the second impedance of the antenna, are readily understood by one of ordinary skill in the art.

For example, if the compound antenna is chosen to have an electrical length of a half wavelength, first impedance in the extended position can have a range of about 400 ohms to about 600 ohms at operating frequencies. If radio circuit 28 has an impedance of approximately 50 ohms, or other value characteristic of radio circuit 28, matching circuit 30 can be selected that substantially matches the first impedance of the antenna to the impedance of radio circuit 28.

Furthermore, if the first antenna portion is, e.g., helicoil 44 and a small segment of rod 46 chosen to have an electrical length of a quarter wavelength, first antenna portion will have a first impedance of about 50 ohms as viewed from feed terminal 36 in the retracted position. Further, if the second antenna portion is, e.g., the remaining segment of rod 46 chosen to have an electrical length of a quarter wavelength and is ground-terminated via ground terminal 38 and placed in close proximity to ground plane 34, the second antenna portion will appear as substantially an open circuit having an impedance that is at least an order of magnitude greater than the impedance of the first antenna portion. Consequently, the second impedance of the antenna in the retracted position is substantially the impedance of the first antenna portion alone, i.e., about 50 ohms. This 50 ohm impedance of radio circuit 28 substantially matches the about 50 ohm second impedance of the antenna.

Accordingly, the reconnected matching circuit 30 is chosen so that does not contribute significantly to the matching, e.g., the impedance of the reconnected matching circuit can have an impedance that is an order of magnitude greater than the second impedance.

Those skilled in the art will recognize that various modifications and variations, in addition to those already described, can be made in the radiotelephone of the present invention and in construction of this radiotelephone without departing from the scope or spirit of this invention. As examples, the demarcation between the first antenna portion and the second antenna portion can be defined by an area where feed terminal 36 couples with the antenna in the retracted position. Accordingly, the first antenna portion can be any part of rod 46, or all of rod 46 and a part of helicoil 44. Furthermore, the first antenna portion and second antenna portion can be radiating elements of different shapes. Also, other configurations of switches and a matching circuit can be used that places the matching circuit in a series configuration with the radio circuit and feed terminal in one configuration, and places the matching circuit in parallel with the antenna in another configuration. And, instead of the second antenna portion being a quarter wavelength, ground terminated and adjacent a ground plane, it can be of a different wavelength, terminated with an impedance, or surrounded by a conductive tube that is grounded. Also, the feed contact and bushing can be the same component, and the feed contact, ground contact, or the switch can be, e.g., disposed on the housing or a component inside the housing.

Reference will now be made in detail to a second embodiment of a radiotelephone configured according to the present invention. Where appropriate the same reference numerals are used to avoid unnecessary duplication and description of similar elements already referred to and described above.

Figure 3:
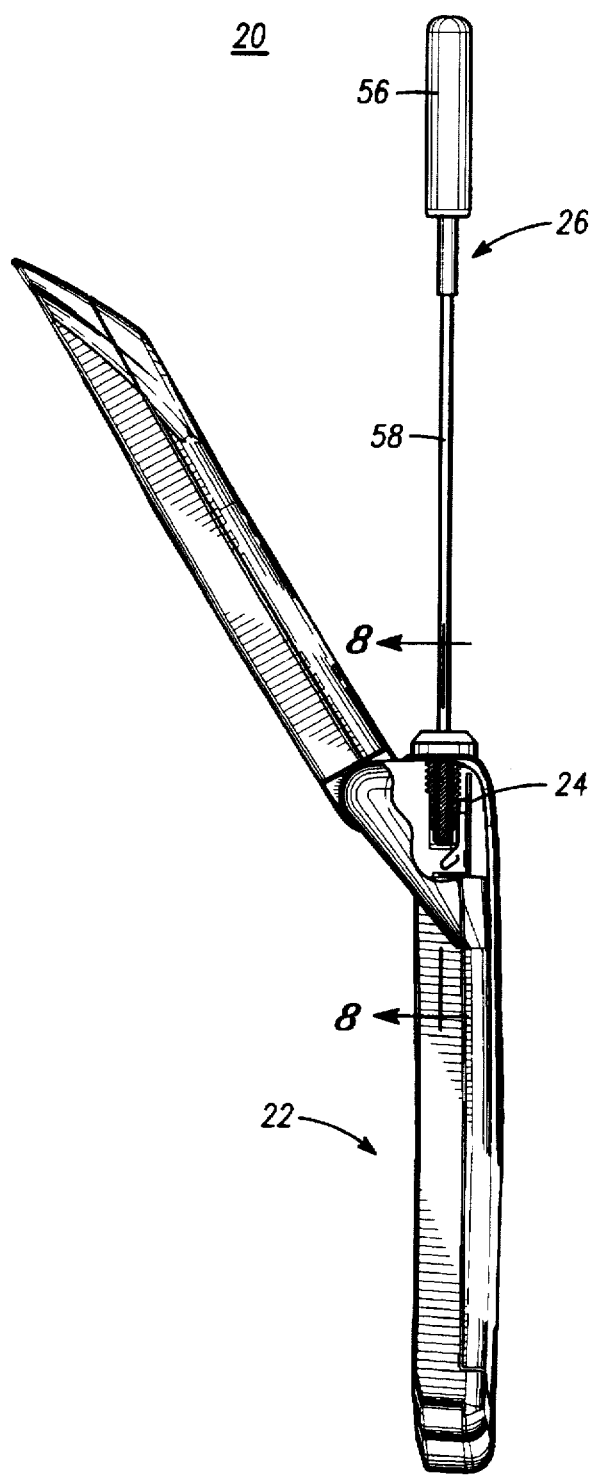
FIG. 3 is a right-side elevation view of a second embodiment of a radiotelephone configured according to the invention, with a partial section view showing certain internal components of the radiotelephone.

FIG. 3 is a right-side elevation view of radiotelephone 20 configured according to the invention, with a partial section view showing certain internal components of the radiotelephone. This figure illustrates, among other things, the physical relationship of antenna assembly 26 in the extended position relative to housing 22 and to circuit board 24 disposed in housing 22. In this embodiment, the antenna of antenna assembly 26 includes a linear radiating element 58 and helical radiating element 56 carried by an end of linear radiating element 58. In the extended position, helical radiating element 56 is located completely outside of housing 22, and linear radiating element 58 is located substantially outside of housing 22.

Figure 4:
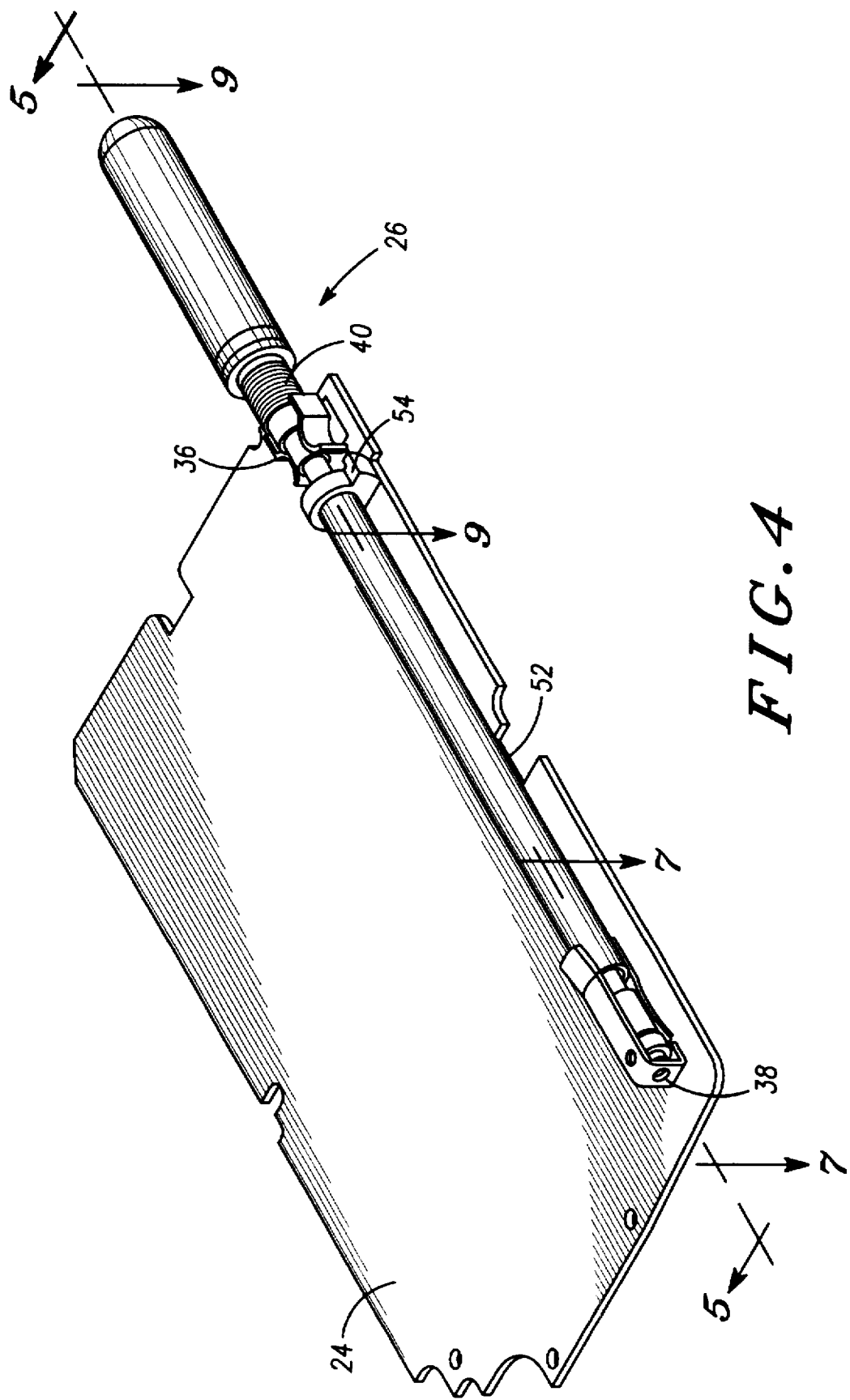
FIG. 4 is a front, bottom, and right-side perspective view of a circuit board, terminals, and an antenna assembly of the radiotelephone shown in FIG. 3.

FIG. 4 is a perspective view of antenna assembly 26 in the retracted position, and highlights the physical configuration of antenna assembly 26 in relation to circuit board 24, feed terminal 36, ground terminal 38. Also shown as optional components of antenna assembly 26 are a tube 52 and a tube support 54 that is affixed to circuit board 24 and holds one end of tube 52 in a fixed position. The other end of tube 52 is held in a fixed position by ground terminal 38. As seen in the figure, ground terminal 38 and feed terminal 36 are affixed near one side of circuit board 24, at opposite ends of the side. In the retracted position, ground terminal 38 makes direct physical and electrical contact with the first portion of the second portion of the antenna, and feed terminal 36 makes direct physical and electrical contact with the second portion of the second portion of the antenna. Also, bushing 40, which is affixed to housing 22 in this embodiment, is shown disposed adjacent feed terminal 36.

Tube 52 can be composed of a nonconductive material, e.g., plastic, and serves to guide the antenna from the extended position to the retracted position, as the antenna moves through the interior of tube 52. Moreover, tube 52 can be coated with a conductive material or be composed entirely of a conductive material and coupled with a ground. In this configuration, tube 52 can be used act upon the first portion of the antenna as viewed from feed terminal 36 so that it appears as a relatively high impedance relative to the to the impedance of the second antenna portion of the antenna.

Figure 5:
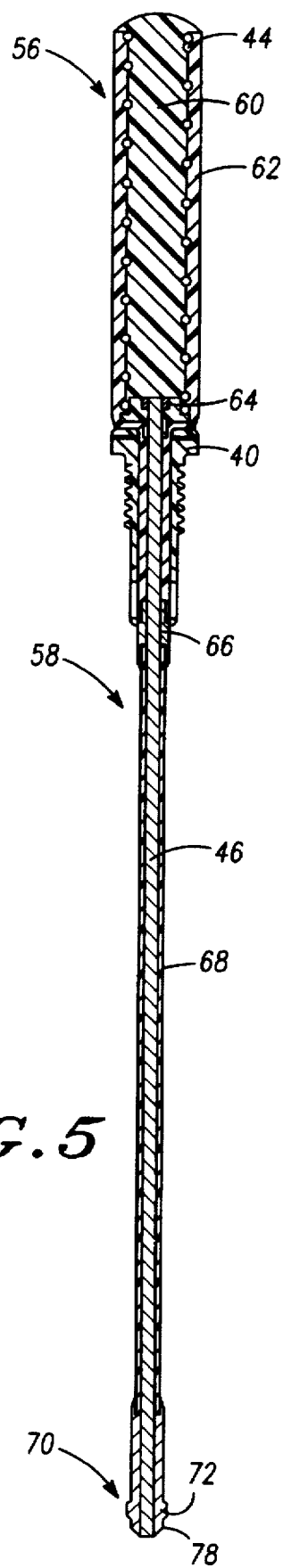
FIG. 5 is a cross section view of the antenna and the bushing shown in FIG. 4.

FIG. 5 is a cross section of the antenna and the bushing shown in FIG. 4, illustrating the details of compound antenna 42 for this embodiment. Helical radiating element 56 can include helicoil 44 wrapped around a core 60. Linear radiating element 58 can include rod 46. Alternatively, helical radiating element 56 and linear radiating element 58 can be a combination of coil and rod antenna elements. Helicoil 44 is fastened to an end of rod 46 by a suitable means, e.g., an upper ferrule 64 that is crimped onto rod 46 and soldered to an end of helicoil 44 as in this embodiment. Other suitable equivalent means may be used to fasten helicoil 44 to rod 46, e.g., spot welding or soldering the coil to the rod; press fitting or inserting the end of the coil into a well formed in the end of the rod or a hole formed in the side of the rod; or using the non-conductive material surrounding helicoil 44 to rod 46.

Lower ferrule 70 is affixed near or at end of rod 46; and a collar 66 is affixed near the other end of rod 46, at a location below helicoil 44. The ferrule and the collar can be fixedly attached to the rod by crimping or some other suitable means. This physical attachment also provides direct electrical coupling of lower ferrule 70 and collar 66 to rod 46. Accordingly lower ferrule 70 serves as a first coupling location on the antenna, and collar 66 serves as a first coupling location on the antenna. Further, in this particular embodiment, the first antenna portion extends from collar 66 to include helicoil 44; and the second antenna portion extends from collar 66 to the end of rod 46.

This particular structural arrangement facilitates the application of a non-conductive material to the metallic parts of the antenna that are not meant to be exposed, i.e., at least a portion of lower ferrule 70 and collar 66. For example, separating the second coupling location, i.e., collar 66, from the means for connecting helicoil 44 and rod 46, i.e., upper ferrule 64, allows the easy application of a coating 62 to helicoil 44, the segment of rod 46 between collar 66 and upper ferrule 64, a portion of collar 66, e.g., by an injection molding process. Further, a sleeve 68 can also be applied to the remaining portion of rod 46 by injection molding.

Although this particular embodiment shows collar 66 and lower ferrule 70 in direct physical and electrical contact with rod 46, a non-conductive material or a dielectric material could separate the ferrule and/or collar from rod 46, and thus be capacitively coupled with rod 46 and form part of the coupling location. Further, the reactance of this capacitive coupling can be considered as a part of the antenna's impedance as viewed from the feed contact.

Furthermore, separating the second coupling location from the means for connecting by a predetermined distance, e.g., the length of the bushing 40, also provides the advantage of removing added rigidity caused by second coupling location being at the same point as the means for connecting. This provides an advantage over known radiotelephones employing a compound antenna that, when the antenna is retracted, the means for connecting is allowed to flex, thus preventing mechanical damage to the junction when, e.g., the radiotelephone is dropped and the floor strikes helical radiating element 56 to apply a torque to the means for connecting.

Figure 6:
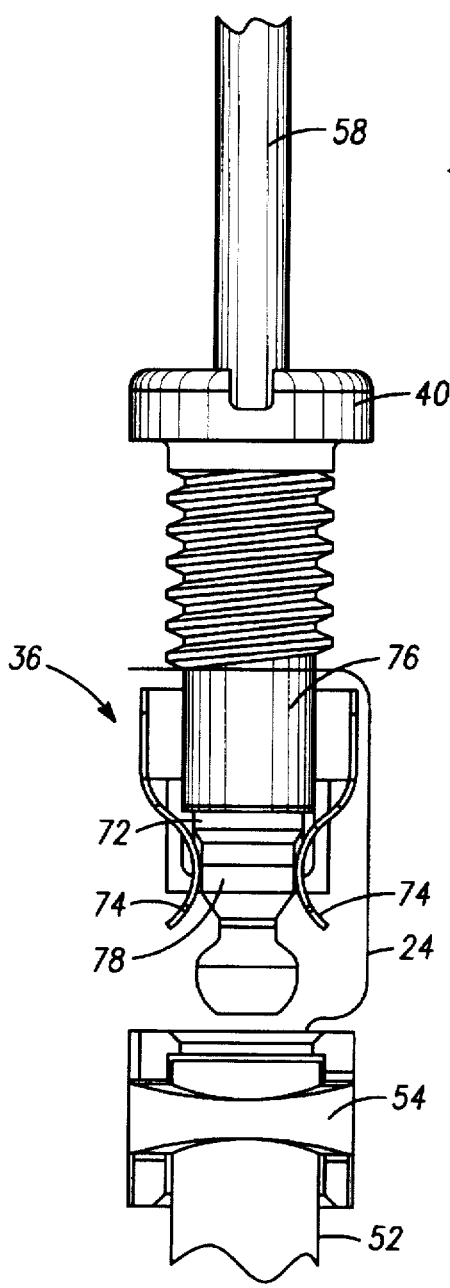
FIG. 6 is a fragmentary front elevation view of the circuit board, a feed terminal, and portions of the antenna assembly shown in FIG. 4, when the antenna is in an extended position.

FIG. 6 is a fragmentary front elevation view of circuit board 24, feed terminal 36, and portions of antenna assembly 26 shown in FIG. 4, when the antenna is in an extended position. This figure illustrates, among other things, the feature of feed terminal 36 not only being electrically coupled with the antenna at a first coupling location, but also holding the antenna in extended position.

In particular, the first coupling location, e.g., lower ferrule 70, has a first section with a first thickness and a second section with a second thickness that is greater than the first thickness. In this particular embodiment, the first thickness is a first diameter of cylindrically shaped tip 78 of lower ferrule 70, and the second thickness is a second diameter of a ring 72 formed on, or out of, lower ferrule 70. (See also FIG. 5.) Although ring 72 encircles lower ferrule 70, the first section can be a bulge that only extends partly around lower ferrule 70 or extends completely around as does ring 72.

Feed terminal 36 including at least one flexible member, e.g., two opposing flexible members such as wings 74 that act as leaf springs. The at least one flexible member can also be a spring loaded device. The antenna is moveable past the flexible members to and from the extended position and the retracted position, the flexible members moving, due to irregularities in the shape of the antenna, in a direction substantially perpendicular to the movement of the antenna. Wings 74 apply an increasing force as they are pushed outward away from the antenna, and are resilient and act to return to their resting position. A lower end 76 of bushing 40, which can be cylindrically shaped, has a diameter smaller than the second diameter, and thus limits the motion of the antenna from the retracted position to the extended position.

Further, in moving to the extended position, ring 72 passes through wings 74 before the first section, the increase and then decrease in spring force exerted by wings 74 as ring 72 passes wings 74 provides tactile or detent feedback to the radiotelephone that the antenna is fully retracted. After ring 72 passes wings 74, wings 74 move inward to contact tip 78. Consequently, ring 72 is held between wings 74 and lower end 76 of the bushing by the force exerted by wings 74.

(The item labeled as reference numeral 86 that appears in FIG. 6 is explained in the discussion corresponding to FIG. 8.)

One of ordinary skill in the art can appreciate that the means for limiting the motion of the antenna to the retracted position can be accomplished by other means, e.g., a second ring formed on the antenna, and that the bushing is not necessary for wings 74 to hold the antenna. For example, lower ferrule 70 can be formed with a concave ring encircling it, and wings 74 resting in the concave ring can hold the antenna in the extended position.

Figure 7:
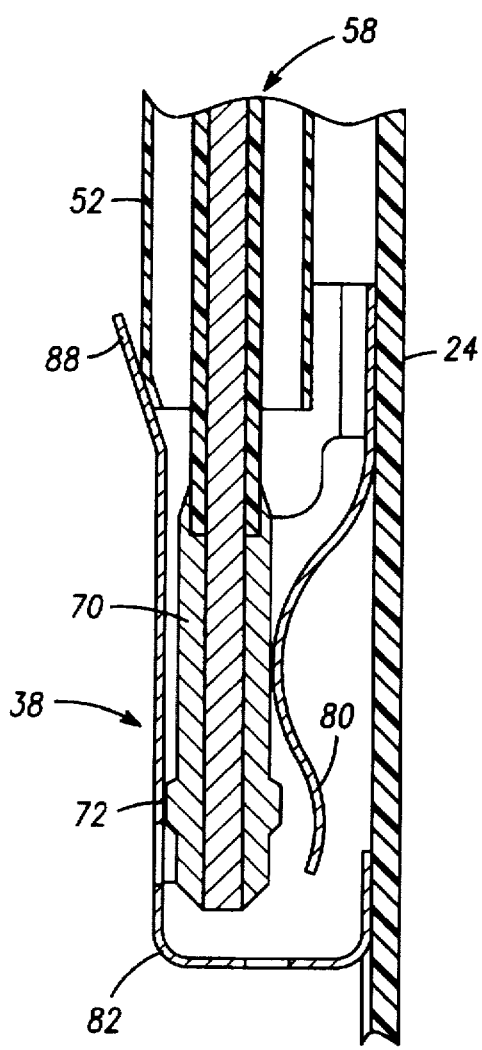
FIG. 7 is a fragmentary cross section view of the circuit board, a ground terminal, and portions of the antenna assembly shown in FIG. 4, when the antenna is in the retracted position.

FIG. 7 is a fragmentary cross section view of circuit board 24, ground terminal 38, and portions of antenna assembly 26 shown in FIG. 4, when the antenna is in the retracted position. This figure illustrates, among other things, the feature of ground terminal 38 not only being electrically coupled with the antenna at the second coupling location, but also holding the antenna in retracted position and holding tube 52.

Ground terminal 38 includes a rigid member 82 and a flexible member 80. These two members can be integrally formed from a single sheet of metal or be two individual elements constituting ground terminal 38, rigid member 82 can be affixed to circuit board 24, as well as rigid member 82, and rigid member 82 can move relative to rigid member 82. Flexible member 80 can be, e.g., a leaf spring or a spring loaded device, and can move in a direction substantially perpendicular the rigid member. When the antenna moves from the extended position to the retracted position, lower ferrule 70 moves into ground terminal 38, and lower ferrule 70 forces the flexible member to move in a direction substantially perpendicular to the movement of the antenna.

Lower ferrule 70 has a bulge formed thereon, e.g., ring 72, and, as the antenna moves to the retracted position, the bulge slides across flexible member 80, which translates to an increased spring force applied to the antenna that the radiotelephone feel and can realize that is reaching the fully retracted position. After the bulge clears flexible member 80, the force on the antenna is reduced, thus informing the user that the fully retracted position has been reached. Flexible member 80 continues to exert a force against the coupling location in the fully retracted position, and thus holds the first coupling location against rigid member 82.

Moreover, rigid member 82 has an upturned end 88 that deflects the end of tube 52 when tube 52 is inserted into ground terminal 38 during assembly. Upturned end 88 pressing against the inserted end of tube 52 holds this end in place. Thus, a separate fastening means is not required to hold the end of the tube, saving circuit board space and easing assembly.

FIGS. 8 and 9 are fragmentary cross section views of the circuit board, a feed terminal, and portions of the antenna assembly shown in FIGS. 3 and 4, when the antenna is in the extended or retracted position, respectively. These figures illustrate, among other things, the feature of an integral feed contact and switch, which can be used as switch 32 shown in FIG. 2.

Circuit board 24 has a pad 84 formed on it. Pad 84 is one part of the switch. This pad can be electrically coupled with, e.g., matching circuit 30, or more particularly with $L_1$.

Feed terminal 36 is affixed to circuit board 24 and can include a member whose movement is operatively responsive to the antenna's physical positions, e.g., a flexible arm 86 which acts as a leaf spring. Flexible arm 86 and wings 74 can be formed from a single sheet of metal using well-known stamping techniques. Flexible arm 86 is disposed relative to pad 84 and forms another part of the switch. Flexible arm 86, or feed terminal 36, can be electrically coupled with, e.g., matching circuit 30, or more particularly with C.

Flexible arm 86 in its resting position projects into the path of the antenna in its movement to and from the extended and retracted positions. Accordingly, in this embodiment, the switch is normally open. Further, it is disposed below wings 74, so that when the antenna is in the retracted position, the switch is normally open. Other configurations are possible. For example, if the electrical contact were located at the opposite end of the circuit board, where ground terminal 38 is located in the illustrated embodiment, the switch would be closed in the retracted position.

Because flexible arm 86 is disposed in the pathway of the antenna, linear radiating element 58 contacts flexible arm 86 during its movement from the retraced position and forces flexible arm 86 to contact pad 84. FIG. 9 illustrates flexible arm 86 contacting pad 84 to make direct electrical contact. Consequently, when the antenna is in one of its two physical positions flexible arm 86 is not electrically coupled with pad 84 to thus place the switch in an open position; and when the antenna is in the other of the antenna's two physical positions flexible arm 86 is electrically coupled with pad 84 to thus place the switch in a closed position.

Furthermore, flexible arm 86 and collar 66 are arranged so that they are in direct physical and electrical contact when the antenna is in the retracted position. Accordingly, feed terminal 36 is electrically coupled with the second coupling location.

In summary, a wireless communication device has been described that provides a matching state between a radio circuit and an antenna in both its retracted and extended positions, and does so with an elegant design that increases reliability and manufacturability by reducing the number and complexity of components and moving mechanical parts. The wireless communication device is also resistant to damage when dropped. A matching circuit, which is reconfigured according to a switch that is responsive to the antenna's position, provides the matching states. Furthermore, the switch can be integrally formed as part of a feed terminal.

What is claimed is:

1. A wireless communication device comprising:
    a feed terminal;
    an antenna, moveable to and from a first position and a second position relative the feed terminal, wherein the feed terminal is electrically coupled to the antenna in either position;
    a radio circuit;
    a ground;
    a matching circuit coupled to the ground and coupled in series between the feed terminal and radio circuit; and
    a switch coupled in parallel connection with the matching circuit and coupled in series between the feed terminal and radio circuit, and operable to change state in response to movement of the antenna, wherein when the switch is in one state the radio circuit is directly coupled with the feed terminal, and when the switch is in another state the radio circuit is coupled with the feed terminal through the matching circuit.

2. The wireless communication device of claim 1 wherein the switch with an open state and a closed state, and the switch is in the open state when the antenna is in the first position.

3. The wireless communication device of claim 1 wherein the antenna including a first coupling location, the feed terminal is coupled with the first coupling location in the first position, the antenna with a first impedance in the first position as viewed from the feed terminal coupled with the first coupling location, and the matching circuit substantially matches the first impedance to an impedance of the radio circuit when the antenna is in the first position.

4. The wireless communication device of claim 3 wherein the switch with an open state and a closed state, and the switch is in the open state when the antenna is in the first position.

5. The wireless communication device of claim 3 wherein the antenna including a second coupling location, the feed terminal is coupled with the second coupling location in the second position, the antenna with a second impedance in a second position as viewed from the feed terminal coupled with the second coupling location, and the matching circuit substantially matches the second impedance to the impedance of the radio circuit when the antenna is in the second position.

6. The wireless communication device of claim 5 wherein the second coupling location divides the antenna into a second antenna portion and a first antenna portion, each portion having an impedance as viewed from the feed terminal coupled with the second coupling location, wherein impedance of the second antenna portion is an order of magnitude greater than the impedance of the first antenna portion.

7. The wireless communication device of claim 6 wherein, when the antenna is in the second position, the impedance of the matching circuit as viewed from the feed terminal is an order of magnitude greater than the impedance of the first antenna portion.

8. The wireless communication device of claim 1 wherein the matching circuit has a first arm, a second arm, and a leg arranged in a "T", wherein the first arm is coupled with the switch and the second arm is coupled with the feed terminal, and the leg is coupled with the ground.

* * * * *